United States Patent
Iida et al.

(10) Patent No.: US 9,242,658 B2
(45) Date of Patent: Jan. 26, 2016

(54) BRAKE DEVICE

(71) Applicant: Mitsubishi Heavy Industries, Ltd., Tokyo (JP)

(72) Inventors: Kohei Iida, Tokyo (JP); Yoshihiro Shiotani, Hiroshima-ken (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 516 days.

(21) Appl. No.: 13/649,228

(22) Filed: Oct. 11, 2012

(65) Prior Publication Data

US 2013/0133989 A1    May 30, 2013

(30) Foreign Application Priority Data

Oct. 21, 2011 (JP) ................................. 2011-231885

(51) Int. Cl.
*F16D 55/22* (2006.01)
*B61H 5/00* (2006.01)
*B61H 1/00* (2006.01)
(Continued)

(52) U.S. Cl.
CPC ............... *B61H 5/00* (2013.01); *B60T 13/741* (2013.01); *B61H 1/00* (2013.01); *F16D 55/224* (2013.01); *F16D 65/18* (2013.01);
(Continued)

(58) Field of Classification Search
CPC ............ F16D 2125/40; F16D 2125/46; F16D 2125/48; F16D 2125/52; F16D 65/14; F16D 65/18; F16D 2121/24; F16D 2121/26; F16D 2121/14; F16D 59/02
USPC ............. 188/71.1, 72.1, 72.3, 72.8, 171, 173, 188/161, 162
See application file for complete search history.

(56) References Cited

U.S. PATENT DOCUMENTS 4,836,338 A * 6/1989 Taig ............................. 188/72.1

FOREIGN PATENT DOCUMENTS

| CN | 102011814 | 4/2011 |
|---|---|---|
| JP | 59-231803 | 12/1984 |

(Continued)

OTHER PUBLICATIONS

Japanese Notice of Reasons for Rejection issued Aug. 13, 2013 in corresponding Japanese Patent Application No. 2011-231885 with English translation.
Chinese Office Action issued Nov. 3, 2014 in corresponding Chinese application No. 201210596642.3 (with partial English translation).

*Primary Examiner* — Robert A Siconolfi
*Assistant Examiner* — Vu Q Nguyen
(74) *Attorney, Agent, or Firm* — Wenderoth, Lind & Ponack, L.L.P.

(57) ABSTRACT

A brake device includes: a braking element which comes into contact with a disc rotating with a wheel and imparts a frictional force to brake the wheel; a pressing piston which presses the disc with the braking element; a pressing part which presses the pressing piston toward the braking element; a driving shaft which moves the pressing piston to a side to which the pressing piston retracts from the braking element; an electric motor which rotates the driving shaft about an axis thereof; a releasing mechanism which rotates the driving shaft to the side to which the pressing piston retracts from the braking element; a switching mechanism which switches between connection and separation of the releasing mechanism and the driving shaft; and a stopper mechanism which restricts rotation of the driving shaft to a side to which the pressing piston advances toward the braking element.

2 Claims, 4 Drawing Sheets

(51) Int. Cl.
  *B60T 13/74* (2006.01)
  *F16D 55/224* (2006.01)
  *F16D 65/18* (2006.01)
  *F16D 121/14* (2012.01)
  *F16D 121/26* (2012.01)
  *F16D 125/40* (2012.01)

(52) U.S. Cl.
  CPC ........ *F16D 2121/14* (2013.01); *F16D 2121/26* (2013.01); *F16D 2125/40* (2013.01)

(56) References Cited

FOREIGN PATENT DOCUMENTS

| | | |
|---|---|---|
| JP | 61-13037 | 1/1986 |
| JP | 2003-510531 | 3/2003 |
| JP | 2003-172384 | 6/2003 |
| JP | 2005-172124 | 6/2005 |
| JP | 2010-025313 | 2/2010 |
| JP | 2010-64569 | 3/2010 |

* cited by examiner

BRAKE DEVICE

BACKGROUND OF THE INVENTION

1. Field of the Invention

The present invention relates to a brake device, which brings a braking element into contact with a disc rotating together with a wheel to thereby obtain a braking force, and in particular, to a brake device which has a release device for retracting the braking element from the disc.

The present application claims priority from Japanese Patent Application No. 2011-231885, filed Oct. 21, 2011, the entirety of which is hereby incorporated by reference.

2. Description of Related Art

In recent years, disc brakes are increasingly employed as brakes for railway vehicles because they do not require wear of the wheel to be considered, compared to a brake device of the type which presses a brake shoe directly against a wheel to obtain a braking force, and also they are capable of obtaining a stable braking force regardless of the state of the wheel. As a disc brake for a railway vehicle, there is known a type of disc brake in which a braking element is pressed in a direction toward the disc with the force of a mechanical spring, and it is moved in a direction to separate the two from each other by, for example, an actuator which uses hydraulic fluid pressure.

This type of a disc brake device is provided with a so-called fail safe function such that the braking force still functions with the pressing force of the mechanical spring even in a case where problems with fluid pressure supply occur.

Incidentally, a hydraulic disc brake device requires periodic oil maintenance due to oil leakage and so forth, and has problems with its serviceability. Consequently, it has been considered to use electricity rather than fluid pressure as the power source for disc brake devices for railway vehicles (for example, refer to Japanese Unexamined Patent Application, First Publication No. 2010-25313).

However, in a state where fail safe is functioning, the braking force remains being applied to the wheel and it becomes difficult to move the vehicle. In particular, in comparison with a brake device that uses fluid pressure, in the case of a brake device that uses electricity, a transmission mechanism such as a decelerating mechanism intervenes between the output shaft of the electric motor and the shaft of the pressing piston that presses the braking element, and therefore, a conventional releasing mechanism cannot be simply used.

SUMMARY OF THE INVENTION

The present invention takes into consideration the above circumstances, with an object of providing a brake device provided with a release device capable of, with a simpler configuration, restricting movement of a pressing piston that is being released.

The brake device of the present invention is a brake device which imparts a frictional force to a disc rotating together with a wheel to thereby brake the wheel, the brake device comprising: a braking element which comes in contact with the disc and imparts a frictional force thereto; a pressing piston which advances and retracts in a direction of pressing the braking element against the disc so as to be able to press the disc with the braking element; an pressing part which presses the pressing piston toward the braking element; a driving shaft which has a driving side screw part threadably engaged with a piston side screw part formed in the pressing piston, and which is capable, by rotating about its axis, of moving the pressing piston to a side to which the pressing piston retracts from the braking element; an electric motor which is connected to the driving shaft and is capable of rotating the driving shaft about its axis; a releasing mechanism which rotates the driving shaft to a side, to which the pressing piston retracts from the braking element; a switching mechanism which is capable of switching between a connected state where the release mechanism and the driving shaft are connected and a separated state where they are separated; and a stopper mechanism which, in the connected state, restricts rotation of the driving shaft to a side to which the pressing piston advances toward the braking element.

According to the above configuration, even in a case where, due to defects in the electric motor, the pressing piston cannot retract from the braking element using the rotation of the driving shaft, the pressing piston can still retract from the braking element using the releasing mechanism.

Moreover, since the stopper mechanism restricts movement of the pressing piston, there is no need for using a separate device for maintaining the separated state, and as a result, the release mechanism can be provided in a simpler configuration.

Furthermore, the releasing mechanism may be restrained from operating in a direction corresponding to a direction of the driving shaft rotating to the side to which the pressing piston advances toward the braking element, and the stopper mechanism may be constituted by the release mechanism.

According to the above configuration, since the stopper mechanism is constituted by the releasing mechanism, a release mechanism having a stopper mechanism can be realized with a simpler configuration.

Moreover, the releasing mechanism may be provided with a driven gear which is capable of rotating according to the rotation of the driving shaft, and a worm gear which engages with the driven gear.

According to the above configuration, by configuring the release mechanism with a worm gear and a driven gear, it is possible to rotate the driven gear by rotating the worm gear. Furthermore, with the tangential force of the driven gear acting in the axial direction of the worm gear, rotation of the driven gear can be restricted. As a result, a releasing mechanism having a stopper mechanism can be realized with a simple configuration.

Moreover, the release mechanism may be provided with a first gear provided on the driving shaft, a second gear which is connected to and separated from the first gear by the switching mechanism, and a third gear provided coaxially with the second gear, and the third gear may serve as a driven gear engaging with the worm gear.

According to the above configuration, by connecting and separating the second gear to and from the first gear, the connected state and the separated state can be easily switched.

Moreover, the configuration may be provided such that the driven gear is a gear provided coaxially with the driving shaft, and the worm gear and the driven gear are connected and separated by the switching mechanism.

According to the above configuration, the releasing mechanism can be provided with a minimum configuration.

According to the present invention, even in a case where, due to defects in the electric motor, the pressing piston cannot retract from the braking element using the rotation of the driving shaft, the pressing piston can still retract from the braking element using the release mechanism. Moreover, since the stopper mechanism restricts movement of the pressing piston, there is no need for maintaining, for example, the function of the releasing mechanism using a separate device, and as a result, the release mechanism can be provided in a simpler configuration.

DETAILED DESCRIPTION OF THE INVENTION

First Embodiment

Hereunder, embodiments of the present invention are described in detail, with reference to the drawings.

Figure 1:
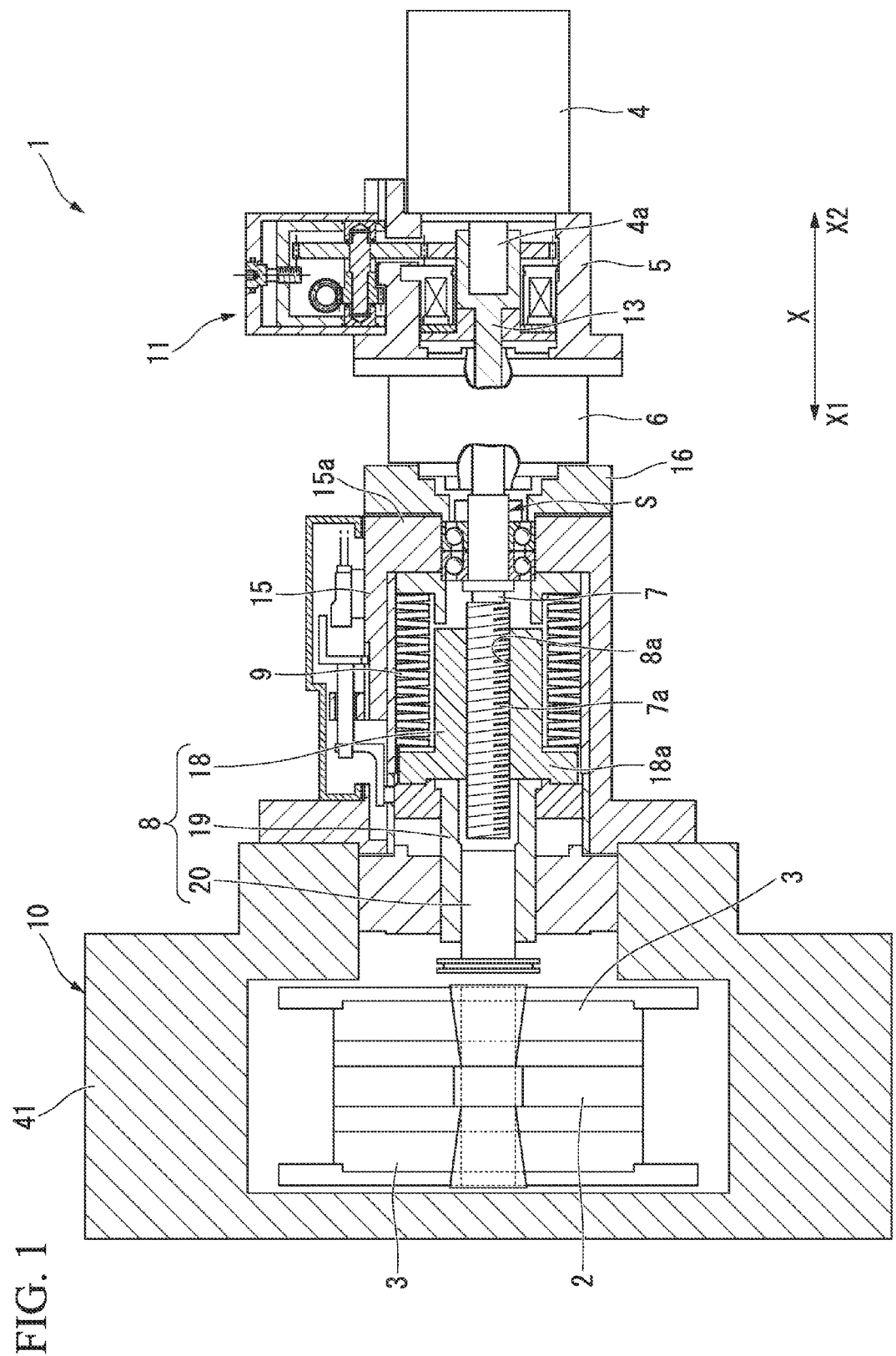
FIG. 1 is a side sectional view of a brake device according to a first embodiment of the present invention.
Figure 2:
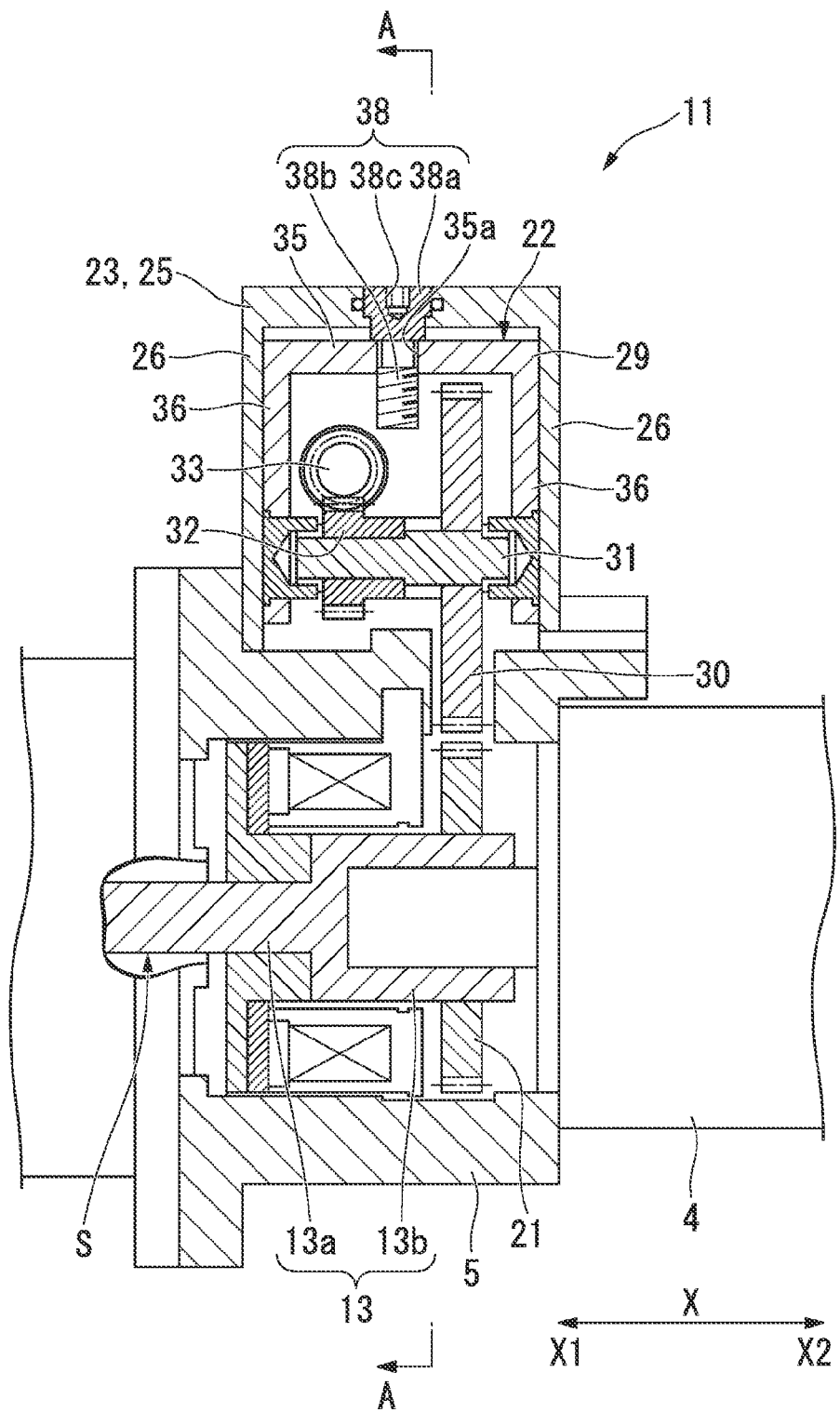
FIG. 2 is an enlarged view of the main parts of a manual releasing mechanism of the brake device according to the first embodiment of the present invention.
Figure 3:
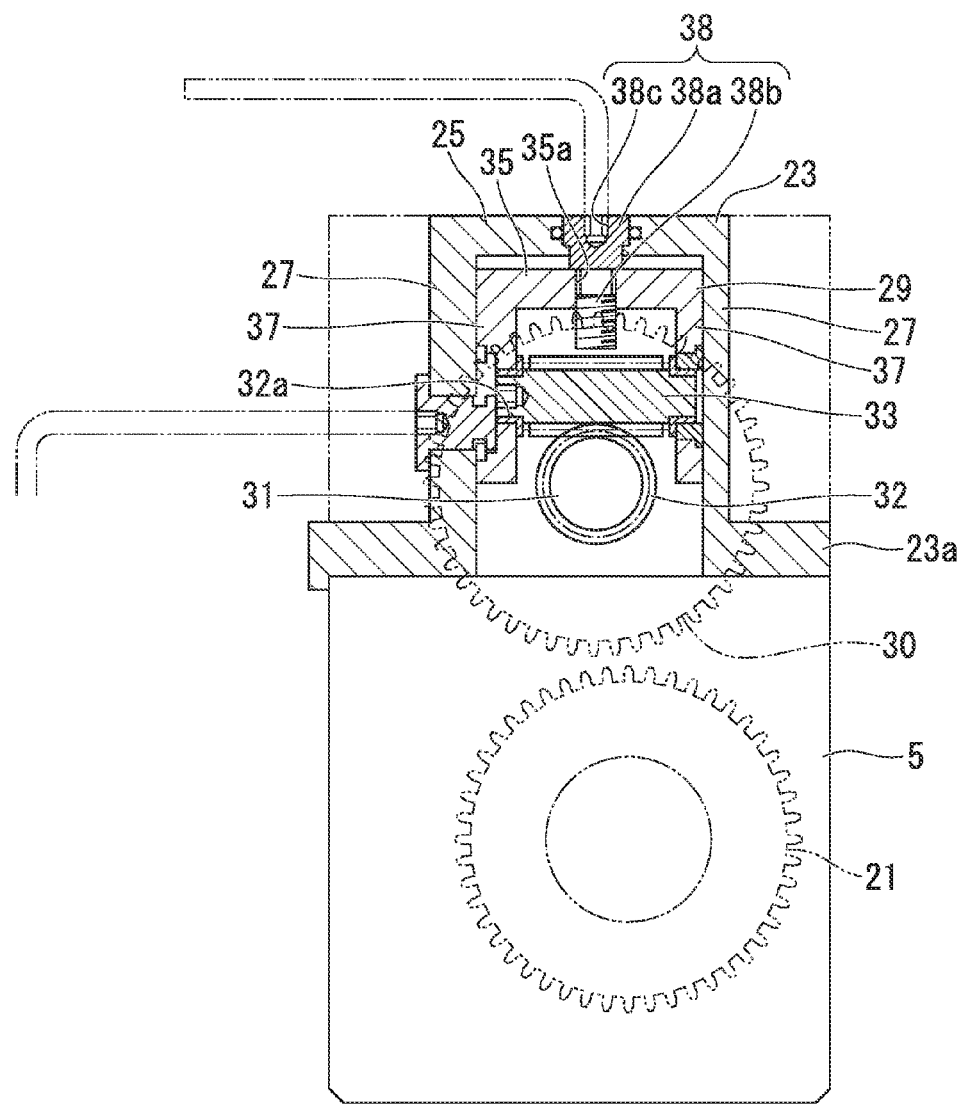
FIG. 3 is an A-A sectional view of FIG. 2.

As shown in FIG. 1, FIG. 2, and FIG. 3, a brake device 1 of the present embodiment is a disc brake type device which presses a pad 3 against a disc 2 rotating together with a wheel (not shown in the figure), to thereby apply a frictional force and brake the wheel.

The brake device 1 is provided with: an electric motor 4; an electromagnetic brake 5 provided so as to brake rotation of an output shaft 4a of the electric motor 4; a ball speed reducer 6 which decelerates rotation of the electric motor 4; a screw shaft 7 which is rotated by decelerated rotation; a pressing piston 8 which transmits a pressing force to the pad 3; a mechanical spring 9 which presses the pressing piston 8 toward the pad 3; a caliper 10 which has the disc 2 and the pad 3 built in; and a manual releasing mechanism 11 for forcing the pad 3 to retract.

In the following description, the output shaft 4a which is rotated by driving of the electric motor 4, a transmission shaft 13 connected to the output shaft 4a (described later), and a screw shaft 7 are collectively referred to as a driving shaft S. Moreover, the direction along the driving shaft S is referred to as an axial direction X, the direction of the pressing piston 8 projecting to press the pad 3 is referred to as a first axial direction X1, and the direction opposite thereof is referred to as a second axial direction X2.

The caliper 10 is provided with a caliper casing 41, the disc-shaped disc 2 which rotates together with the wheel, the pad 3 to be pressed against the disc 2, and a plurality of pins (not shown in the figure) which slidably support the pad 3.

On the output shaft 4a of the electric motor 4, the transmission shaft 13 is attached. The transmission shaft 13 is a shaft member attached to the output shaft 4a in a state where rotation with respect to the rotation shaft 4a is restrained, so as to extend the output shaft 4a of the electric motor 4, and it is constituted by a main body shaft 13a and a connection part 13b. On the connection part 13b a first gear 21 is attached. The first gear 21 is a gear which constitutes the manual release mechanism 11.

The electromagnetic brake 5 is attached to the transmission shaft 13, and it is a part which brakes and maintains rotational movement of the electric motor 4 transmitted to the transmission shaft 13 via the output shaft 4a. The transmission shaft 13 is provided so that the main body shaft 13a projects to the one axial side from the electromagnetic brake 5.

The ball speed reducer 6 is a speed reducer which is attached on one axial side of the electromagnetic brake, for decelerating the rotational speed of the electric motor 4. Specifically, the screw shaft 7 described later is connected to the one end of the ball speed reducer 6 (that is, the first axial direction X1 side), and the main body shaft 13a of the transmission shaft 13 is connected to the other end of the ball speed reducer 6 (that is, the second axial direction X2 side).

The ball speed reducer 6 described above is fixed to the other end (that is, the second axial direction X2 side) of a casing 15 that is fixed to the caliper 10. Specifically, the ball speed reducer 6 is fixed to the casing 15 via a bracket 16 which is fixed to the other end of the casing 15. Furthermore, the electromagnetic brake 5 is fixed directly to the other end (that is, the second axial direction X2 side) of the ball speed reducer 6 with a fastening member such as a bolt, and the electric motor 4 is arranged on the other end (that is, the second axial direction X2 side) of the electromagnetic brake 5. That is to say, the ball speed reducer 6, the electromagnetic brake 5, and the electric motor 4 are arranged so as to be connected in series in the axial direction.

The screw shaft 7 is fixed within the case 15 in a state of being able to rotate about its axis, and the pressing piston 8 is configured so as to move axially with rotation of the screw shaft 7. The other end (that is, the second axial direction X2 side) of the screw shaft 7 is, as described above, connected to the one end (that is the first axial direction X1 side) of the ball speed reducer 6. That is to say, the screw shaft 7 is connected to the electric motor 4 via the ball speed reducer 6 and the transmission shaft 13, and is configured so as to be able to rotate with driving of the electric motor 4.

The pressing piston 8 includes; a moving nut part 18 which is threadably engaged with a driving side screw part 7a formed on the outer circumference of the screw shaft 7, a piston main body 20, and a moving bracket 19 which connects the moving nut part 18 and the piston main body 20.

In the moving nut part 18, there is formed a piston side screw part 8a threadably engaged with the driving side screw part 7a via a plurality of balls. With this configuration, as a result of rotation of the screw shaft 7, the moving nut part 18 (pressing piston 8) reciprocates in the axial direction X with a so-called ball screw mechanism. In the following description, the rotational direction of the driving shaft S (screw shaft 7) in which the moving nut part 18 moves in the second axial direction X2 is referred to as one direction (forward direction). That is to say, with the output shaft 4a of the electric motor 4 rotating in the one direction, the pressing piston 8 moves in the second axial direction X2.

Moreover, on the moving nut part 18, there is formed a flange 18a.

The moving bracket 19 is fixed to the one end (that is, the first axial direction X1 side) of the moving nut part 18, and moves in the axial direction in response to the movement of the moving bracket 19. On the one end (that is, the first axial direction X1 side) of the moving bracket 19, the piston main body 20 is fixed.

The mechanical spring 9 is arranged to the ball speed reducer 6 side (that is, the second axial direction X2 side) from the flange 18a of the moving nut part 18. Specifically, the mechanical spring 9 is constituted by a disc spring, and it is arranged between the flange 18a and a shaft end wall 15a of the casing 15. Thereby, the moving nut part 18 (pressing piston 8) is always pressed in the first axial direction X1.

Next, the manual releasing mechanism 11 is described. The manual release mechanism 11 has: the first gear 21 provided on the transmission shaft 13; a moving unit 22; and a frame 23 which movably supports the moving unit 22. The moving unit 22 can be in a connected state, in which the manual releasing mechanism 11 moves toward and engages to the first gear 21, and a separated state, in which the manual release mechanism 11 is separated from the first gear 21.

The first gear 21 is a spur gear provided integrally with the transmission shaft 13, and rotates in response to driving of the electric motor 4.

The frame 23 is in a box shape with one open face, and it is attached on the upper face of the electromagnetic brake 5 via a flange 23a provided on the one face. Specifically, the frame 23 includes; an upper wall 25 on the opposite side to the open one face, a pair of first side walls 26 orthogonal to the axial direction, and a pair of second side walls 27 orthogonal to the upper wall 25 and the first side walls 26.

The moving unit 22 has: a cube-shaped moving housing 29; a second gear 30 which is set to engage with the first gear 21 by placing the moving unit 22 in the connected state; a rotation shaft 31 on which the second gear 30 is fixed; a worm wheel 32 (helical gear) fixed to the rotation shaft 31; and a worm gear 33 arranged so as to engate with the worm wheel 32.

The moving housing 29 includes: a moving upper wall 35 provided parallel with the upper wall 25 of the frame 23; a pair of shaft fixation walls 36 provided parallel with the first side walls 26 of the frame 23; and a pair of worm fixation walls 37 provided parallel with the second side walls 27 of the frame 23.

The upper wall 25 of the frame 23 and the moving upper wall 35 of the moving housing 29 are connected via a moving bolt 38. The moving bolt 38 includes a head part 38a and a thread part 38b, and the head part 38a is attached to the upper wall 25 so as to be able to rotate about the axis of the thread part 38b. Moreover, in the head part 38a, there is formed a hexagonal socket 38c. In the moving upper wall 35, there is formed a threaded hole 35a corresponding to the thread part 38b of the moving bolt 38.

The rotation shaft 31 is fixed between the pair of shaft fixation walls 36 of the moving housing 29 so as to be able to rotate freely and be parallel with the driving shaft.

The second gear 30 is fixed on the rotation shaft 31 at a position where it engages with the first gear 21 when the moving housing 29 has moved into the connected state.

The worm wheel 32 is fixed on the rotation shaft 31 in the vicinity of the end part on the opposite side to the second gear 30.

The worm gear 33 is rotatably fixed between the pair of the worm fixation walls 37 of the moving housing 29, at a position where it engages with the worm wheel 32. In the one end face of the worm gear 33, a hexagonal socket 32a is formed.

Here, a moving operation of the moving unit 22 is described. In order to move the moving unit, the moving bolt 38 is rotated using a hexagonal wrench or the like. By rotating the moving bolt 38, the moving housing 29 moves in the axial direction of the moving bolt 38 due to the screw action between the moving bolt 38 and the threaded hole 35a which is formed in the moving upper wall 35 of the moving housing 29 and is threadably engaged with the thread part 38b of the moving bolt 38.

In the moving housing 29, rotation of the shaft fixation walls 36 and the worm fixation walls 37 about the axis of the moving bolt 38 is restricted by the first side walls 26 and the second side walls 27. Therefore, the moving housing 29 will not be rotated by rotation of the moving bolt 38.

Next, an operation of the manual releasing mechanism 11 is described.

When making the manual release mechanism 11 to function, the moving unit 22 is moved by the method described above to bring the manual releasing mechanism 11 into a state of being connected with the driving shaft. In this state, the worm gear 33 is rotated, using a tool such as a hexagonal wrench. With the rotation of the worm gear 33, the worm wheel 32 is rotated, and in response to this, the rotation shaft 31 and the second gear 30 rotate.

Since the manual release mechanism 11 is in the connected state, the first gear 21 is rotated with the rotation of the second gear 30, and as a result, the transmission shaft 13 which constitutes the driving shaft, rotates in the one direction. With the rotation of the transmission shaft 13 in the one direction, the driving shaft rotates via the ball speed reducer 6 in the one direction, and the ball screw mechanism moves the moving nut part 8 in the second axial direction X2 to thereby separate the pressing piston from the pad 3. As a result, the brake device is brought to a released state.

According to the embodiment above, even in a case where, due to defects in the electric motor 4, the pressing piston 8 cannot retract from the pad 3 using the rotation of the driving shaft S, the pressing piston 8 can still retract from the pad 3 using the manual releasing mechanism 11.

Moreover, since a worm gear 33 is used as an input gear for operating the manual release mechanism 11, the tangential force of the worm wheel 32 is placed in the axial direction of the worm gear 33. As a result, shifting of the pressing piston 8 in the first axial direction X1 by unintended rotation of the first gear 21, which is connected to the worm gear 33 through the worm wheel 32, the rotation shaft 31, and the second gear 30, can be prevented. That is to say, the worm gear 33 functions as a stopper mechanism to restrict the shifting of the pressing piston 8. Therefore for example, there is no need for maintaining the function of the releasing mechanism using a separate device, and as a result, the release mechanism can be provided in a simpler configuration.

Moreover, by connecting and separating the second gear 30 to and from the first gear 21, the connected state and the separated state can be easily switched.

Second Embodiment

Next, a brake device 1B according to the second embodiment of the present invention is described.

Figure 4:
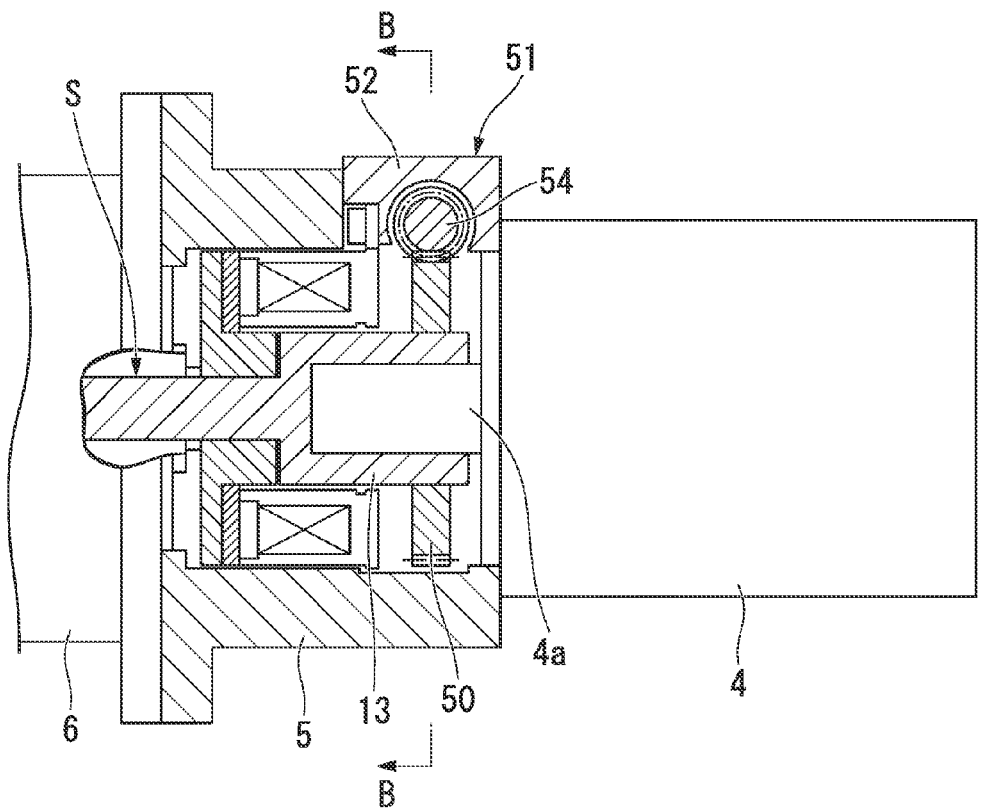
FIG. 4 is a side sectional view of a manual release mechanism of the brake device according to the second embodiment of the present invention.
Figure 5:
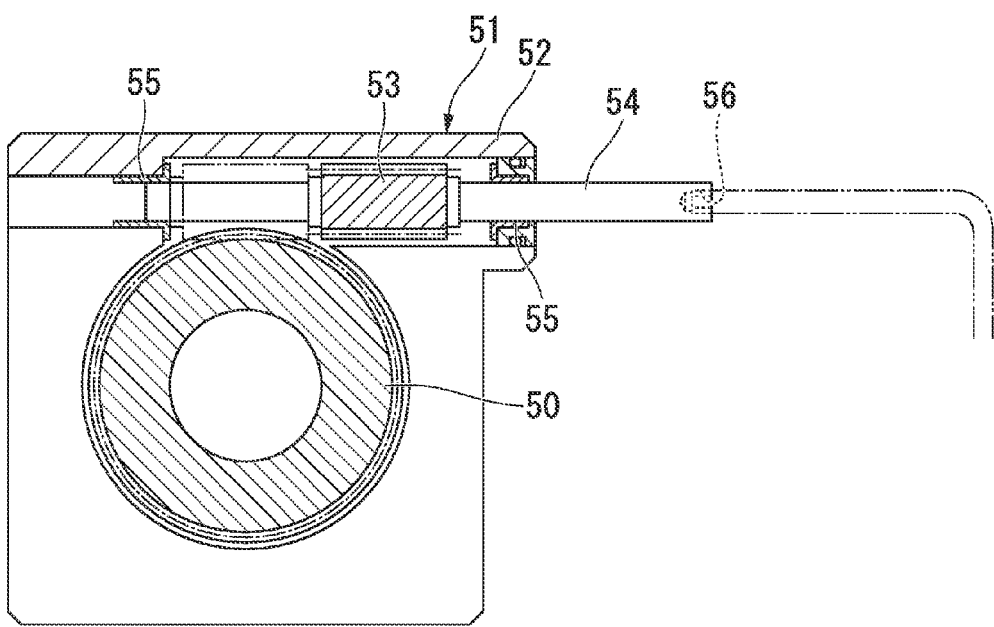
FIG. 5 is a B-B sectional view of FIG. 4.

As shown in FIG. 4 and FIG. 5, a manual releasing mechanism 11B of a brake device 1B of the present embodiment includes a worm wheel 50 and a moving worm gear mechanism 51.

The worm wheel 50 is a helical gear which engages with a worm gear main body 53 described later, and it is fixed to the transmission shaft 13 as with the first gear 21 of the first embodiment.

The moving worm gear mechanism 51 includes: a casing 52; a worm gear main body 53 which cooperates with the worm wheel 50 to function; and a moving shaft 54 which is a rotation shaft of the worm gear main body 53.

The moving shaft 54 is attached to the casing 52 so as to be able to freely rotate and freely move in the direction orthogonal to the driving shaft S (the rotation shaft of the worm wheel 50). Specifically, both ends of the moving shaft 54 are slidably supported on a pair of bushes 55 that are fixed to the casing 52. Moreover, in one end face of the moving shaft 54, there is formed a hexagonal socket 56, and the one end of the moving shaft 54 extends out to the outside of the casing 52.

The worm gear main body 53 is fixed substantially at the center of the moving shaft 54, and it can be connected to the worm wheel 50 upon sliding movement of the moving shaft 54. Moreover, the worm gear main body 53 can be separated from the worm wheel 50 upon sliding movement of the moving shaft 54.

Hereunder, an operation of the manual release mechanism 11B according to the present embodiment is described.

In the normal state of the brake device 1B, the worm gear main body 53 and the worm wheel 50 are in a separated state.

When making the manual releasing mechanism 11B to function, the moving shaft 54 is moved to thereby bring the worm gear main body 53 and the worm wheel 50 into a connected state where they are connected. In this state, the moving shaft 54 is rotated using a hexagonal nut or the like to rotate the worm gear main body 53. Upon rotation of the worm gear main body 53, the worm wheel 50 rotates and the transmission shaft 13 rotates in the one direction. As a result of the rotation of the transmission shaft 13 in the one direction, the brake device 1 is brought to a released state with the action similar to that of the first embodiment.

According to the embodiment above, even in a case where, due to defects in the electric motor 4, the pressing piston 8 cannot retract from the pad 3 using the rotation of the driving shaft S, the pressing piston 8 can still retract from the pad 3 using the manual release mechanism 11B.

Moreover, since a worm gear main body 53 is used as an input gear for operating the manual releasing mechanism 11B, shifting of the pressing piston 8 in the first axial direction X1 by unintended rotation of the worm wheel 50 can be prevented. That is to say, the worm gear main body 53 functions as a stopper mechanism to restrict the shifting of the pressing piston 8. Therefore for example, there is no need for maintaining the function of the release mechanism using a separate device, and as a result, the releasing mechanism can be provided in a simpler configuration.

Furthermore, by slide-moving the moving shaft 54, the connected state and the separated state can be easily switched.

Moreover, it is possible to provide a release mechanism with fewer constituents in comparison with the first embodiment.

The technical scope of the present invention is not limited by the above embodiments, and various modifications may be made without departing from the scope of the invention.

In each embodiment described above, a worm gear is used as a stopper mechanism to restrict the driving shaft S from rotating to the side where the pressing piston 8 shifts toward the pad 3. However for example, the stopper mechanism may be provided with use of a spur gear substituted for the worm gear, with a plate spring arranged so as to be always in contact with the teeth of the spur gear in order to restrict rotation of the spur gear.

DESCRIPTION OF REFERENCE SYMBOLS

1 Brake device
2 Disc
3 Pad (braking element)
4 Electric motor
7 Screw shaft
7a Driving side screw part
8 Pressing piston
8a Piston side screw part
9 Mechanical spring (pressing part)
11 Manual releasing mechanism (release mechanism)
13 Transmission shaft
18 Moving nut part
21 First gear
22 Moving unit (switching mechanism)
30 Second gear
32 Worm wheel (third gear)
33 Worm gear (stopper mechanism)
50 Worm wheel
51 Moving worm gear
53 Worm gear main body
S Driving shaft

What is claimed is:

1. A brake device configured to impart a frictional force to a disc configured to rotate together with a wheel to thereby brake the wheel, the brake device comprising:
    a braking element configured to come into contact with the disc and impart a frictional force thereto;
    a pressing piston configured to advance and retract in a direction of pressing the braking element against the disc so as to be able to press the disc with the braking element;
    a pressing part configured to press the pressing piston toward the braking element;
    a driving shaft which has a driving side screw part threadably engaged with a piston side screw part formed in the pressing piston, and which is capable, by rotating about an axis thereof, of moving the pressing piston to a side to which the pressing piston is configured to retract from the braking element;
    an electric motor which is connected to the driving shaft and is capable of rotating the driving shaft about an axis thereof;
    a releasing mechanism configured to rotate the driving shaft to the side to which the pressing piston is configured to retract from the braking element;
    a switching mechanism which is capable of switching between a connected state in which the releasing mechanism and the driving shaft are connected and a separated state in which the releasing mechanism and the driving shaft are separated; and
    a stopper mechanism which, in the connected state, is configured to prevent rotation of the driving shaft to a side to which the pressing piston is configured to advance toward the braking element,
    wherein the releasing mechanism is provided with:
        a first gear provided on the driving shaft;
        a second gear provided on a rotation shaft, the second gear being connected to or alternatively separated from the first gear by the switching mechanism,
        a third gear provided coaxially with the second gear, the third gear being provided on an end part of the rotation shaft on a side opposite to the second gear, and
        a worm gear engaged with the third gear.

2. The brake device according to claim 1, wherein the releasing mechanism is restrained from operating in a direction corresponding to a rotating direction of the driving shaft to the side to which the pressing piston is configured to advance toward the braking element, and the stopper mechanism is constituted by the releasing mechanism.

* * * * *